(12) United States Patent
Bugge

(10) Patent No.: US 9,531,238 B2
(45) Date of Patent: Dec. 27, 2016

(54) MODULAR ACTUATION DEVICE FOR AN AERODYNAMIC CONTROL SURFACE OF A MISSILE

(71) Applicant: Raytheon Company, Waltham, UT (US)

(72) Inventor: John F. Bugge, Waltham, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/155,088

(22) Filed: Jan. 14, 2014

(65) Prior Publication Data

US 2016/0226338 A1    Aug. 4, 2016

Related U.S. Application Data

(60) Provisional application No. 61/857,590, filed on Jul. 23, 2013.

(51) Int. Cl.

| F16H 1/46 | (2006.01) |
|---|---|
| H02K 7/116 | (2006.01) |
| F42B 14/00 | (2006.01) |
| F41G 3/00 | (2006.01) |

(52) U.S. Cl.
CPC ............ *H02K 7/116* (2013.01); *F16H 1/46* (2013.01); *F41G 3/00* (2013.01); *F42B 14/00* (2013.01)

(58) Field of Classification Search
CPC ............. F16H 1/46; F42B 10/62; B64C 13/34
See application file for complete search history.

(56) References Cited

U.S. PATENT DOCUMENTS

| 2,366,072 A | 12/1944 | Tucker et al. |
|---|---|---|
| 4,183,266 A * | 1/1980 | Osumi .................... 475/337 |
| 4,193,325 A * | 3/1980 | Cotreau .................. 475/337 |
| 4,848,663 A * | 7/1989 | Sherbrooke .......... 239/265.19 |
| 5,429,558 A * | 7/1995 | Lagarde .................. 475/344 |
| 6,603,421 B1 | 8/2003 | Schiff et al. |

(Continued)

FOREIGN PATENT DOCUMENTS

| JP | 2008-1137 | * | 1/2008 |
|---|---|---|---|
| WO | WO 2006/086532 A2 | | 8/2006 |

OTHER PUBLICATIONS

PCT application PCT/US2014/039289; filed May 23, 2014; Raytheon Company; International Search Report mailed Jan. 30, 2015.

*Primary Examiner* — Sherry Estremsky

(57) ABSTRACT

A modular actuation device for an object, such as an aerodynamic control surface of a missile. The modular actuation device can include an outer support structure configured to couple with an external support member, such as a structural portion of a missile. The modular actuation device can also include an electric motor to provide an input torque and having an outer casing coupled to the outer support structure. The modular actuation device can further include an epicyclic gear train disposed within the outer support structure and operably coupled to the electric motor to receive the input torque. The epicyclic gear train can be configured to provide an output torque to move the object. In addition, the modular actuation device can include a torque output member disposed at least partially within the outer support structure and coupled to the epicyclic gear train to receive the output torque. The torque output member can be configured to couple with the object.

21 Claims, 5 Drawing Sheets

(56) References Cited

U.S. PATENT DOCUMENTS

| | | | | |
|---|---|---|---|---|
| 6,739,550 | B2* | 5/2004 | Koizumi et al. | 244/99.4 |
| 8,585,537 | B2* | 11/2013 | Miyawaki et al. | 475/337 |
| 2007/0129207 | A1* | 6/2007 | Kanamori | 475/331 |
| 2013/0040777 | A1* | 2/2013 | Gassmann et al. | 475/337 |
| 2013/0269305 | A1* | 10/2013 | Wang et al. | 56/14.7 |
| 2014/0135166 | A1* | 5/2014 | Wang et al. | 475/337 |
| 2014/0371028 | A1* | 12/2014 | Billmeyer | 475/337 |

\* cited by examiner

MODULAR ACTUATION DEVICE FOR AN AERODYNAMIC CONTROL SURFACE OF A MISSILE

RELATED APPLICATION

This application claims the benefit of U.S. Provisional Application No. 61/857,590, filed Jul. 23, 2013 which is incorporated herein by reference in its entirety.

BACKGROUND

Electromechanical actuators are in widespread use for providing control and deployment of aerodynamic surfaces or structures, such as fins, wings, or other airfoils. For missile aerodynamic control surface operation, there are many unique forms of actuation systems, many of which incorporate electric motors, reduction gears, an output shaft with load support bearings, and a position feedback system. These are typically constructed on an individual basis conforming to the constraints of the space envelope.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
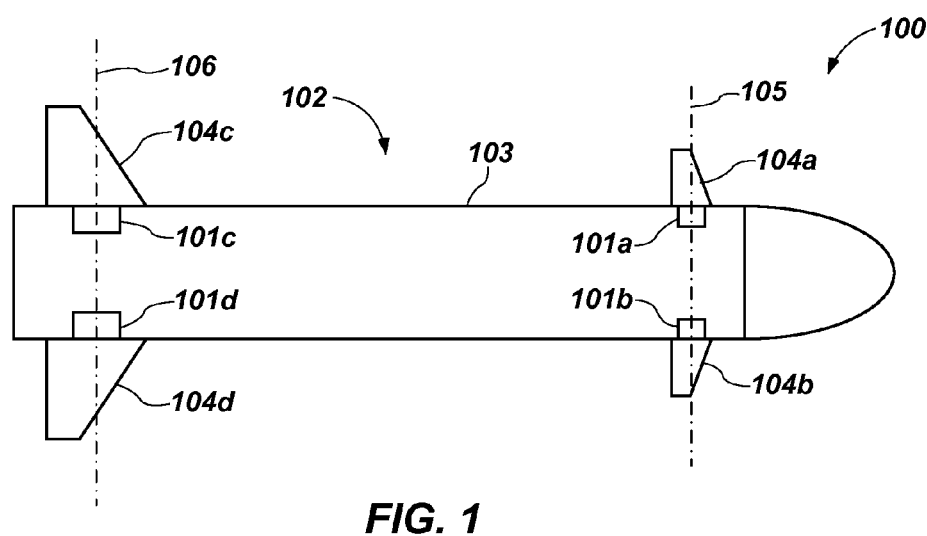
FIG. 1 is an example illustration of a missile aerodynamic control surface actuation system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Disclosed herein is a modular actuation device for the actuation of any suitable object moveable relative to an external support member. For example, the module actuation device can be used to actuate various aerofoil surfaces (i.e., control or flight), pointing mechanisms (e.g., turrets for use in gun elevation), and azimuth controls, such as may be found on various support members of missiles, UAV's, manned aircraft, boats or ground vehicles, etc. Although the description herein centers around examples of a modular actuation device suitable for use with an aerodynamic control surface of a missile, this is not meant to be limiting in any way.

Although typical aerodynamic control surface actuator systems for missiles are functional, many include intricate mechanisms that are expensive to develop, manufacture, and install. For example, in order to fit within space constraints a typical actuator system may include a motor that is laterally offset relative to a missile control surface or structure that the motor controls. This configuration can necessitate an intricate torque transfer mechanism, such as gear elements, to connect the motor to the missile control surface or structure. An actuator for a missile aerodynamic control surface that offers reduced size and complexity can therefore alleviate concerns over space constraints and reduce costs to develop, manufacture, and install.

Accordingly, a modular actuation device is disclosed. In one aspect, the modular actuation device can be more compact, less complex, and easier to manufacture and install compared to typical missile aerodynamic control surface actuator systems. In another aspect, a design of a modular actuation device can be scaled according to the requirements a given application, allowing the design to be reused for different missile control surface actuation systems. The modular actuation device can include an outer support structure. The modular actuation device can also include an electric motor to provide an input torque and having an outer casing coupled to the outer support structure. The modular actuation device can further include an epicyclic gear train disposed within the outer support structure and operably coupled to the electric motor to receive the input torque. The epicyclic gear train can be configured to provide an output torque to move an object. In addition, the modular actuation device can include a torque output member disposed at least partially within the outer support structure and coupled to the epicyclic gear train to receive the output torque. The torque output member can be configured to couple with the object. An axis of rotation of the electric motor can be parallel to an axis of rotation of the torque output member.

In one aspect, an actuation system is disclosed. The system can comprise an external support member and an object moveable relative to the external support member, as well as a modular actuation device. The modular actuation device can include an outer support structure coupled with the external support member. The modular actuation device can also include an electric motor to provide an input torque and having an outer casing coupled to the outer support structure. The modular actuation device can further include an epicyclic gear train disposed within the outer support structure and operably coupled to the electric motor to receive the input torque. The epicyclic gear train can be configured to provide an output torque to move the object. Additionally, the modular actuation device can include a torque output member disposed at least partially within the outer support structure and coupled to the epicyclic gear train to receive the output torque. The torque output member can be configured to couple with the object. An axis of rotation of the electric motor can be parallel to an axis of rotation of the torque output member.

One embodiment of a missile aerodynamic control surface actuation system 100 is illustrated in FIG. 1. The system 100 can comprise a missile 102 having a structural portion 103, such as a body or fuselage, and an aerodynamic control surface or structure 104*a-d*, such as a fin or a wing. The system 100 can also include a modular actuation device 101*a-d* to control movement and/or positioning of the control surface 104*a-d*, respectively. For example, front aerodynamic control surfaces or structures 104*a*, 104*b* can be caused to rotate about an axis 105, and rear aerodynamic control surfaces 104*c*, 104*d* can be caused to rotate about an axis 106 to provide control of the missile 102 while in flight. In one aspect, a modular actuation device of the present disclosure may be used for wing deployment. Although two front and two rear aerodynamic control surfaces or structures 104*a-d* are shown, it should be recognized that a missile can include any suitable number of aerodynamic control surfaces or structures, which may be actuated for rotational movement about any suitable axis.

Unlike typical actuation systems for missile aerodynamic control surfaces, the modular actuation device 101*a-d* disclosed herein can comprise a self-contained unit, which can include all electro-mechanical elements for aerodynamic control surface actuation, such as a motor, a position sensor, gearing, and a torque output shaft or member for coupling with an aerodynamic control surface or structure. The self-contained modular unit can be independently testable and simple to install and integrate into a missile support structure. In general, the modular actuation device 101*a-d* will have fewer parts than typical actuation systems for missile aerodynamic control surfaces.

Figure 2:
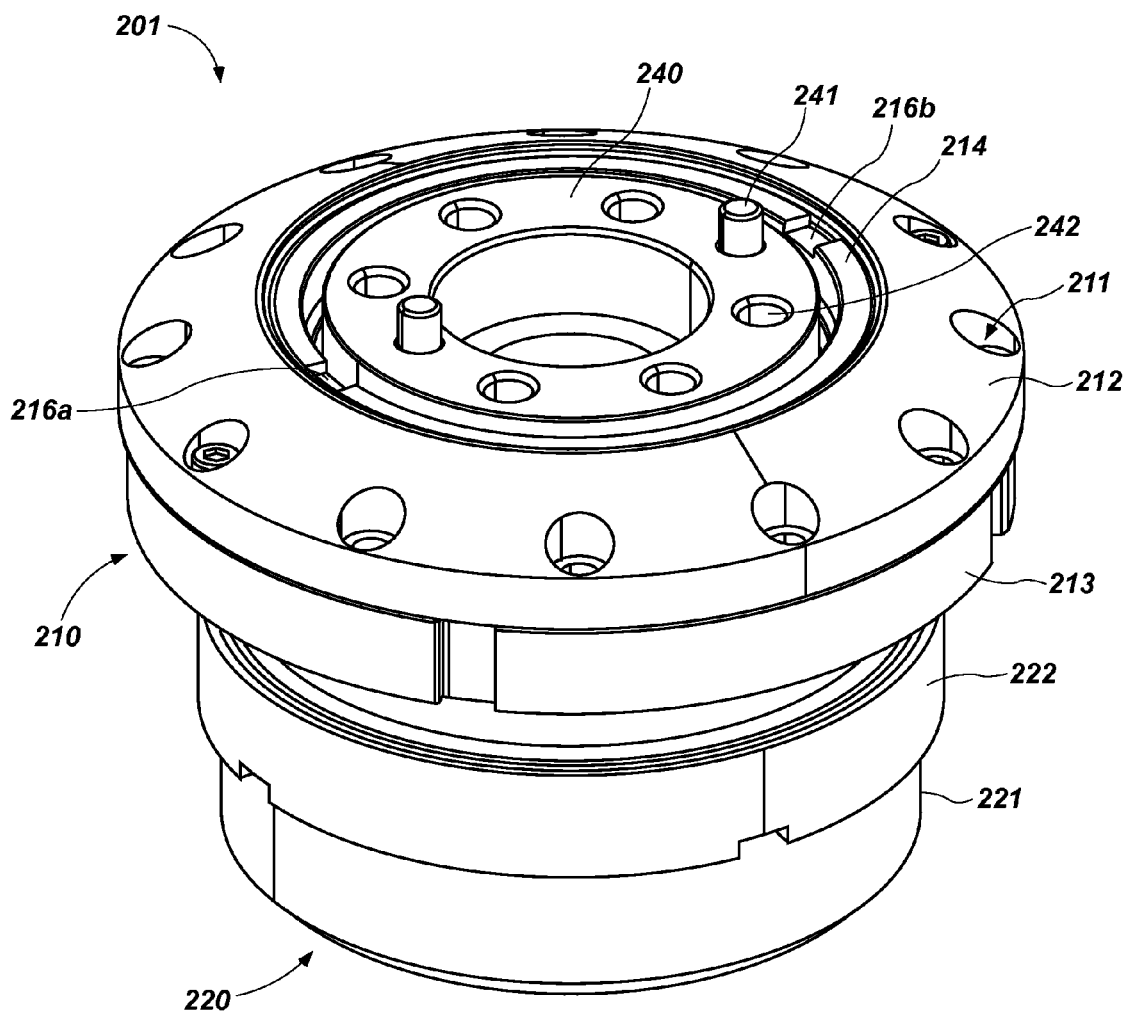
FIG. 2 is a perspective view of a modular actuation device in accordance with an example of the present disclosure.
Figure 3:
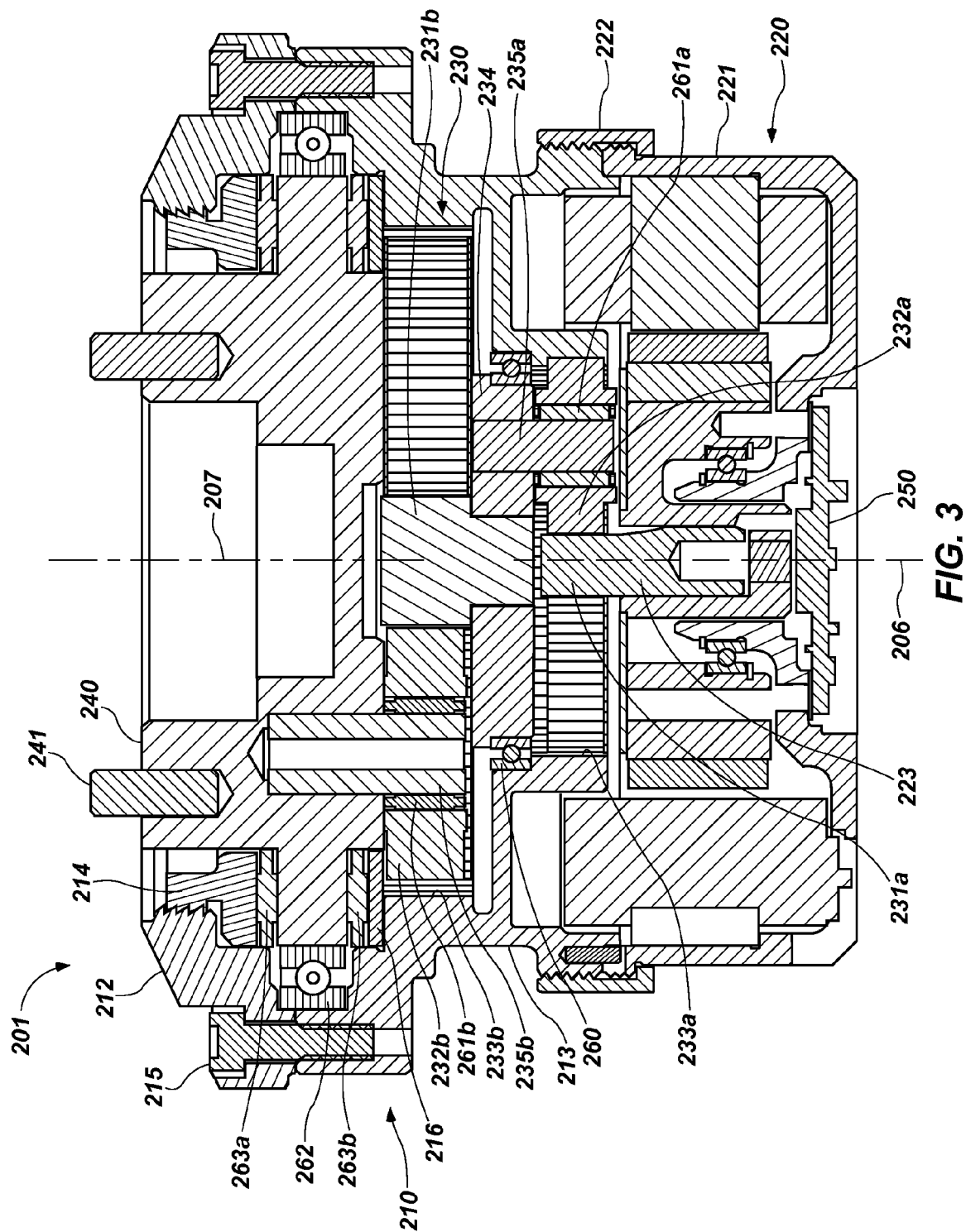
FIG. 3 is a cross-sectional view of the modular actuation device of FIG. 2.

With reference to FIGS. 2 and 3, a modular actuation device 201 in accordance with an example of the present disclosure is shown. The modular actuation device 201 is a self-contained unit that is independent of a missile housing or support structure and can be coupled to such a structure. This is in contrast to typical actuation systems, which are integrated and consequently complicated and expensive to build. In one aspect, the modular actuation device 201 can include an outer support structure 210 configured to couple with a structural portion of a missile, such as with one or more bolts or other suitable fasteners via holes 211 extending through an annular cap 212 and a housing 213 of the outer support structure 210.

The modular actuation device 201 can also include an electric motor 220, such as a brushed or brushless DC motor, to provide an input torque. In some embodiments, the motor 220 can be a relatively large diameter, low height, frameless, brushless DC motor, which in combination with other aspects of the modular actuation device 201 described hereinafter, can contribute to a compact, low-profile actuation device. Relatively large diameter, brushless DC motors can provide some performance benefits over small high speed motors in high torque applications. For example, thermal inertia can be greater due to the increased mass and thermal dissipation can be greater due to the increased area. In one aspect, a motor diameter can be between about 1 inch and about 4 inches, but the motor can be of any suitable diameter.

The electric motor 220 can have an outer casing 221 coupled to the outer support structure 210, such as with a threaded ring fastener or nut 222. The outer support structure 210 and the outer casing 221 of the electric motor 220 can be configured in a cylindrical form factor, which can further contribute to a compact, low-profile actuation device as well as facilitate ease of assembly with a receptacle of a missile structure configured to receive the actuation device 201. As described further hereinafter, the principles and concepts of the present disclosure can provide a modular actuation device that is scalable according to the torque and power requirements of a given application, allowing a design to be reused for different missile control surface actuation systems without resorting to a complete redesign. For example, the same basic actuator design can be configured across a wide range of performance requirements for torque, rotation rate, and load. A modular actuation device of the present disclosure will, in general, be simple to construct and assemble compared to typical control surface actuation systems.

The modular actuation device 201 can further include an epicyclic gear train 230 disposed within, and supported by, the outer support structure 210. The epicyclic gear train 230 can be operably coupled to the electric motor 220 to receive the input torque from the motor. The epicyclic gear train 230 can be configured to provide an output torque to move the aerodynamic control surface or structure of the missile. In addition, the modular actuation device 201 can include a torque output member 240 disposed at least partially within the outer support structure 210 and coupled to the epicyclic gear train 230 to receive the output torque. The torque output 240 member can be configured to couple with the aerodynamic control surface or structure, such as via one or more pins 241 and/or holes 242. In one aspect, the torque output member 240 can be configured in accordance with a predetermined standard interface requirement for engaging and coupling with an aerodynamic control surface or structure. A position sensor 250 can be associated with the electric motor 220 to determine a position of the aerodynamic control surface or structure. It should be recognized that any suitable material may be used for a given component described herein. For example, materials used may include high strength steels, aluminum, titanium, carbon fiber or other composites, molded engineering plastics, etc.

With particular reference to FIG. 3, the electric motor 220 can be configured to transfer torque to the epicyclic gear train 230 via an output shaft 223. In one aspect, the output shaft 223 of the electric motor 220 can be configured to transfer torque directly to a sun gear 231*a* of the epicyclic gear train 230. The sun gear 231*a* and the output shaft 223 can be rotatable about a common axis. As shown in the figure, in some embodiments, a portion of the output shaft 223 can form the sun gear 231*a*. In contrast to typical actuation systems for missile aerodynamic control surfaces, the axis 206 of rotation of the electric motor output shaft 223 is parallel to an axis 207 of rotation of the torque output member 240. In a particular aspect, as shown in the figure, the axes 206, 207 can be substantially coaxial. Thus, a rotation axis of a missile aerodynamic control surface coupled to the torque output member 240 can be coaxial to a rotation axis of the electric motor 220.

In addition to the sun gear 231a, the epicyclic gear train 230 can include a planetary gear 232a engaged with both the sun gear 231a and a ring gear 233a. The ring gear 233a can be formed in, integral with, or otherwise fixed to the housing 213 of the outer support structure 210, which can fix the ring gear 233a relative to the missile. The planetary gear 232a can be coupled to a carrier 234 via a shaft 235a. The carrier 234 can be supported by, and rotatable relative to, the housing 213. A bearing 260 can facilitate rotation of the carrier 234 relative to the housing 213. In addition, a bearing 261a can facilitate rotation of the planetary gear 232a about the shaft 235a.

In order to achieve a desired gear reduction from the electric motor 220 to the torque output member 240, an epicyclic gear train can include any suitable number of "stages" in series. For example, the epicyclic gear train 230 illustrated in FIG. 3 includes two stages. Multiple stages can be employed to achieve a suitable gear ratio. In one aspect, a gear ratio can be between about 30-60:1. In a particular aspect, a gear ratio can between about 40-50:1. As shown in the figure, first stage components are disposed between the motor 220 and second stage components, as described in more detail below. In this case, the carrier 234 is fixed to a second sun gear 231b. A planetary gear 232b is engaged with both the sun gear 231b and a ring gear 233b, which can be formed in, integral with, or otherwise fixed to the housing 213 of the outer support structure 210. One or more planetary gears 232b can be coupled to the torque output member 240, which can serve as a carrier for the planetary gears 232b, via a shaft 235b. Thus, the epicyclic gear train 230 can have a planetary gear carrier (the torque output member 240) that provides the output torque for moving an aerodynamic control surface or structure. The torque output member 240 can be supported by, and rotatable relative to, the annular cap 212 and the housing 213. The annular cap 212 can secure the torque output member 240 to the outer support structure 210 and provide an opening to facilitate access to the torque output member 240 for coupling with an aerodynamic control surface or structure. In addition, a bearing 261b can facilitate rotation of the planetary gear 232b about the shaft 235b.

One or more bearings can facilitate rotation of the torque output member 240 relative to the annular cap 212 and the housing 213, as well as support torsional and/or overturning moments resulting from loads on an aerodynamic control surface or structure coupled to the torque output member 240. For example, a radial ball bearing 262 and platform needle roller thrust bearings 263a, 263b can be disposed between the torque output member 240 and the annular cap 212 and/or the housing 213. A preload ring 214 can provide preload for the platform needle roller thrust bearings 263a, 263b. For example, the annular cap 212 can be secured to the housing 213 via one or more bolts or fasteners 215. The preload ring 214 can be coupled to the annular cap via a threaded interface, which permits independent rotation of the preload ring 214 to preload the platform needle roller thrust bearings 263a, 263b. The preload ring 214 can serve as an outer bearing race for bearing 263a opposite an inner bearing race 216 between bearing 263b and the housing 213. The preload ring 214 can include a feature, such as a slot 216a, 216b (see FIG. 2), to facilitate interfacing with a tool for applying preload to the bearings, such as a spanner wrench. The radial ball bearing 262 and the platform needle roller thrust bearings 263a, 263b can provide a compact configuration for supporting and facilitating rotation of the torque output member 240 when subjected to torsional and/or overturning moments resulting from loads on an aerodynamic control surface or structure coupled to the torque output member 240.

In one aspect, the engagement of the sun gear 231a with the planetary gear 232a, and the support provided by the ring gear 233a associated with the housing 213 can provide an additional support for the electric motor 220. This can reduce or minimize the size of the motor 220 by minimizing the bearings and related structure needed to adequately support the electric motor 220. For example, due to integration of the electric motor 220 with the epicyclic gear train 230 and the support provided by the gear components, the motor 220 can include a minimum number of bearings, such as the single bearing 224. Not only can the first stage gear components provide support for the motor 220 but, similarly, the second stage gear components can provide support for the first stage gear components, which can reduce bearing size and/or eliminate the need for certain bearings. Utilizing the epicyclic gear train components to provide stability for other gear train components as well as the motor 220 can further contribute to a compact, low-profile, and "high density" configuration.

Figure 4:
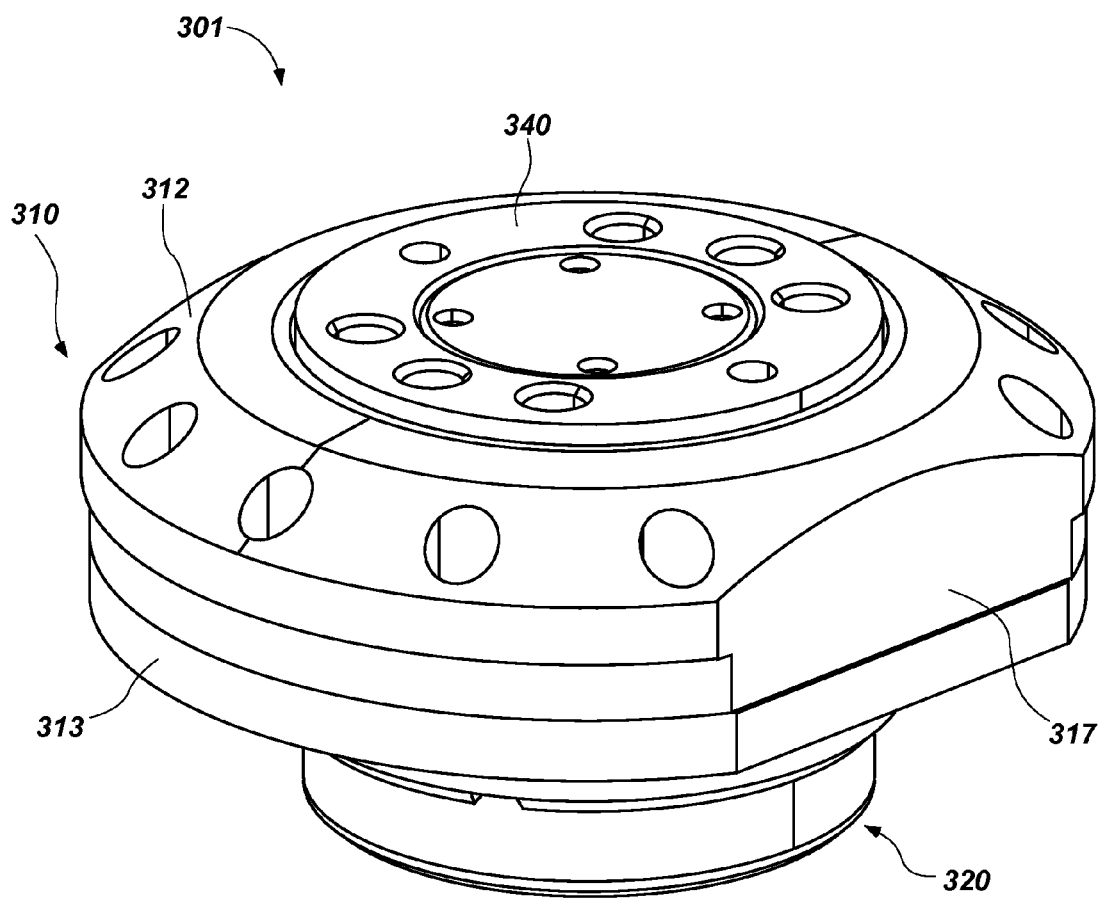
FIG. 4 is a perspective view of a modular actuation device in accordance with another example of the present disclosure.
Figure 5:
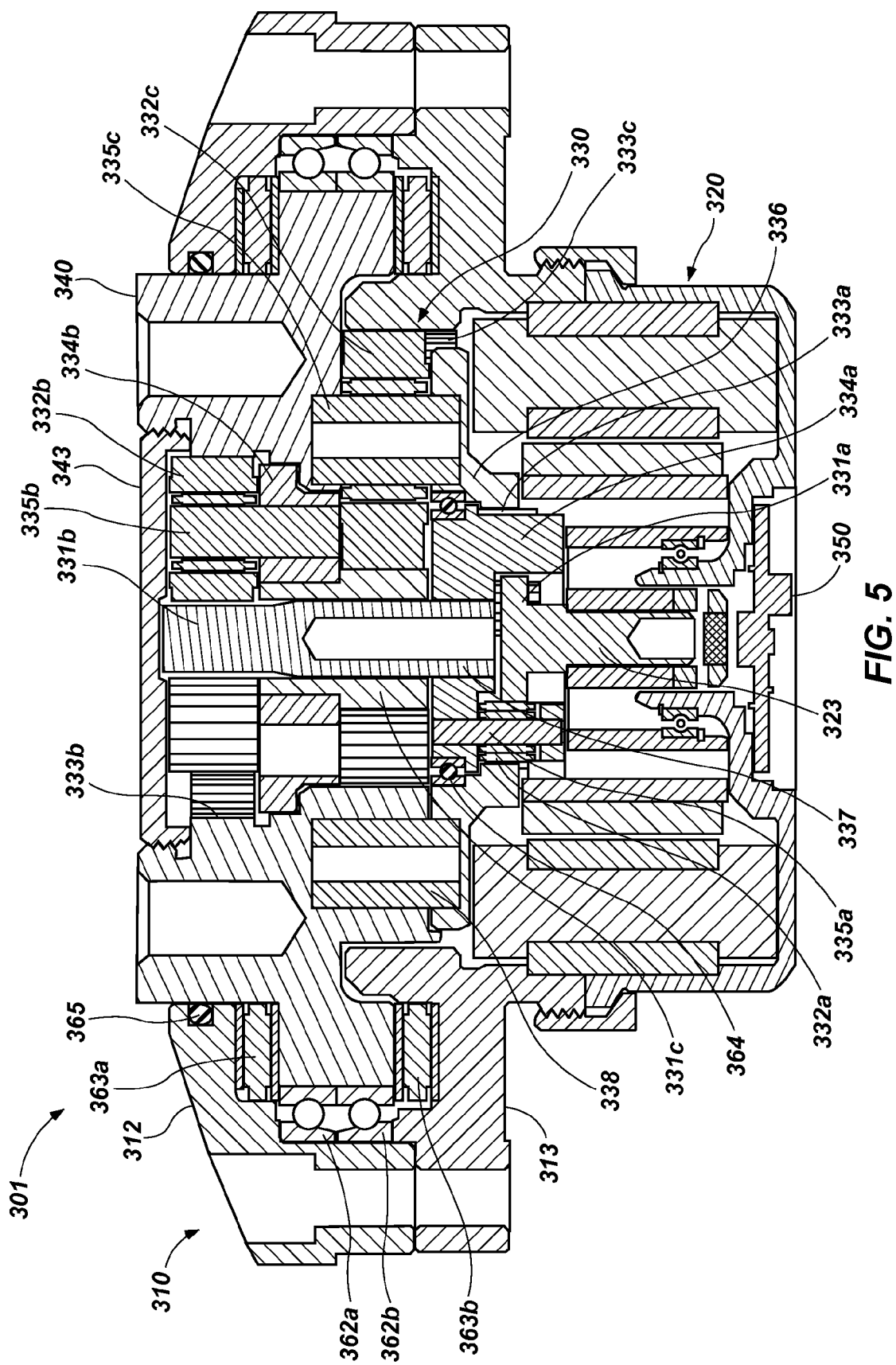
FIG. 5 is a cross-sectional view of the modular actuation device of FIG. 4.

FIGS. 4 and 5 illustrate a modular actuation device 301 in accordance with another example of the present disclosure. Although the modular actuation device 301 comprises a generally cylindrical configuration, an outer support structure 310 includes at least one "flat" portion 317 to provide rigidity when mounting and/or coupling with a structural portion of a missile, which can also reduce the size of the modular actuation device 301 and contribute to a compact configuration. The modular activation device 301 is similar to the modular activation device 201 of FIGS. 2 and 3 in many respects and therefore provides similar advantages discussed above. For example, the modular activation device 301 includes an outer support structure 310 including an annular cap 312 and a housing 313, an electric motor 320, an epicyclic gear train 330, a torque output member 340, and a position sensor 350. In this case, however, the epicyclic gear train 330 comprises three stages where third stage components are disposed between first stage components and second stage components, which illustrates another configuration for a compact, high density, and low-profile modular actuation device.

For example, with particular reference to FIG. 5, an output shaft 323 of the motor 320 can be coupled to or include a first stage sun gear 331a. The first stage of the epicyclic gear train 320 can include a planetary gear 332a engaged with both the first stage sun gear 331a and a ring gear 333a. The ring gear 333a can be formed in, integral with, or otherwise fixed to a ring gear support member 336. The planetary gear 332a can be coupled to a first stage carrier 334a via a shaft 335a. The first stage carrier 334a can be fixedly coupled to a second stage sun gear shaft 337 having a second stage sun gear 331b at an opposite end. The second stage sun gear shaft 337 can extend through a center of a third stage sun gear 331c, such that the second and third stage sun gears 331b, 331c can rotate independently of one another. The second stage of the epicyclic gear train 320 can include a planetary gear 332b engaged with both the second stage sun gear 331b and a ring gear 333b. The ring gear 333b can be formed in, integral with, or otherwise fixed to the torque output member 340. The planetary gear 332b can be coupled to a second stage carrier 334b via a shaft 335b. In one aspect, the second stage carrier 334b can "float" without bearings, contributing to a compact modular actuation device 301 configuration. In addition, second stage components can be disposed within a portion of the torque output member 340, which can contribute to a compact modular actuation device 301 configuration, particularly when incorporating three or more epicyclic gear train stages, as in the present example. A cover 343 can be coupled to the torque output member 340, such as via a threaded engagement, to shield and protect the second stage components and/or other interior components of the modular actuation device 301.

The second stage carrier 334b can be fixed to the third stage sun gear 331c. A planetary gear 332c is engaged with both the sun gear 331c and a ring gear 333c, which can be formed in, integral with, or otherwise fixed to the housing 313 of the outer support structure 310 to fix the ring gear 333c relative to the missile. The planetary gear 332c can be coupled to the torque output member 340, which can serve as a third stage carrier. In one aspect, the ring gear support member 336 and the torque output member 340 can be fixedly coupled to one another, such as by a shaft 335c, 338, pin, or fastener, and can therefore combine to serve as a carrier for the planetary gear 332c. A bearing 364 can provide support and facilitate relative rotation between the ring gear support member 336, which can rotate with the torque output member 340, and the first stage carrier 334a, which rotates with the first stage planetary gear 332a.

The torque output member 340 can be supported by, and rotatable relative to, the annular cap 312 and the housing 313. The annular cap 312 can secure the torque output member 340 to the outer support structure 310 and provide an opening to facilitate access to the torque output member 340 for coupling with an aerodynamic control surface or structure. Radial ball bearings 362a, 362b and platform needle roller thrust bearings 363a, 363b can be disposed between the torque output member 340 and the annular cap 312 and/or the housing 313 to facilitate rotation of the torque output member 340 relative to the annular cap 312 and the housing 313, as well as support torsional and/or overturning moments resulting from loads on an aerodynamic control surface or structure coupled to the torque output member 340. In one aspect, two relatively small radial ball bearings 362a, 362b can be used in place of a single larger radial ball bearing to reduce or minimize a diameter of the modular actuation device 301. Fasteners (not shown) that couple the annular cap 312 to the housing 313 can preload the platform needle roller thrust bearings 363a, 363b. An O-ring 365 can be used to form a seal between the annular cap 312 and torque output member 340.

Figure 6:
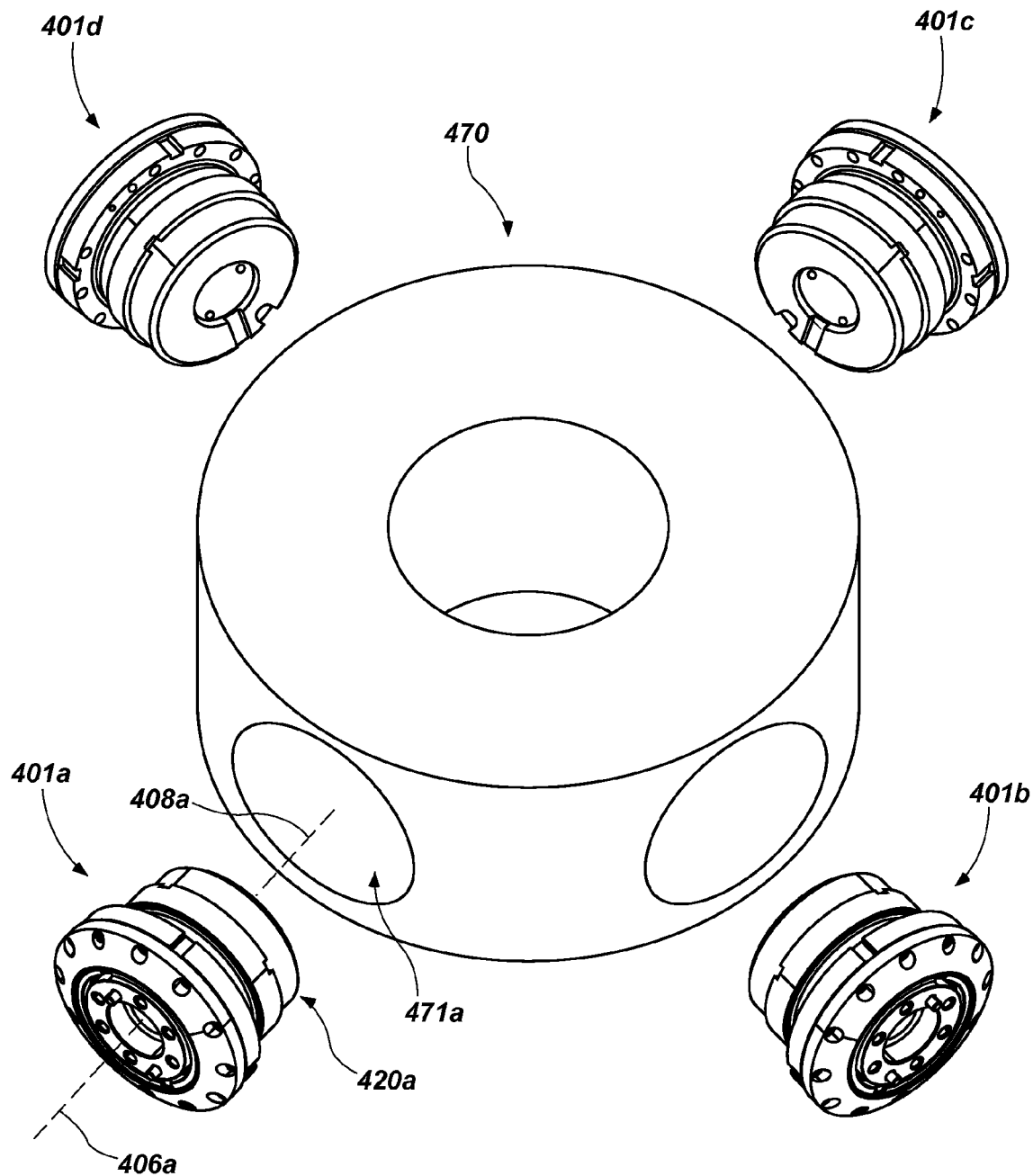
FIG. 6 is an exploded view of a structural portion of a missile and modular actuation devices, in accordance with an example of the present disclosure.

FIG. 6 illustrates a structural portion 470 of a missile configured to receive and support modular actuation devices 401a-d, in accordance with an example of the present disclosure. For example, the structural portion 470 can include a generally cylindrical opening 471a configured to receive at least a portion of the modular actuation device 401a. The modular actuation device 401a can be secured to the structural portion 470 via bolts or other suitable fasteners, as mentioned above. In one aspect, a longitudinal axis 408a of the cylindrical opening 471a can be parallel to, or more particularly, coaxial with an axis of rotation 406a of an electric motor 420a of the modular actuation device 401a. The cylindrical form of the modular actuation device 401a and the cylindrical opening 471a can facilitate assembly, which may be performed by an automated system. The modular actuation device 401a can simply be inserted radially into the opening 471a and bolted to the structural portion 470 of the missile. When fully assembled with the structural portion 470 of the missile, the modular actuation devices 401a-d can be operably connected to any suitable control system and a power source, such as a battery.

In accordance with one embodiment of the present invention, a method for facilitating actuation of an object is disclosed. The method can comprise providing a modular actuation device, having an outer support structure, an electric motor to provide an input torque and having an outer casing coupled to the outer support structure, an epicyclic gear train disposed within the outer support structure and operably coupled to the electric motor to receive the input torque, wherein the epicyclic gear train is configured to provide an output torque to move an object, and a torque output member disposed at least partially within the outer support structure and coupled to the epicyclic gear train to receive the output torque, wherein an axis of rotation of the electric motor is parallel to an axis of rotation of the torque output member. The method can also comprise facilitating coupling of the outer support structure with an external support member. Additionally, the method can comprise facilitating coupling of the torque output member with the object. In one aspect, an axis of rotation of the electric motor is coaxial to an axis of rotation of the torque output member. It is noted that no specific order is required in this method, though generally in one embodiment, these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A modular actuation device comprising:
an outer support structure;
an electric motor to provide an input torque and having an outer casing coupled to the outer support structure;
an epicyclic gear train disposed within the outer support structure and operably coupled to the electric motor to receive the input torque, wherein the epicyclic gear train is configured to provide an output torque to move an object;
a torque output member disposed at least partially within the outer support structure and coupled to the epicyclic gear train to receive the output torque, wherein the torque output member is configured to couple with the object; and
a platform needle roller thrust bearing and a radial ball bearing disposed between the torque output member and the outer support structure.

2. The modular actuation device of claim 1, wherein the epicyclic gear train comprises at least two-stages.

3. The modular actuation device of claim 2, wherein the at least two-stages comprises first stage components disposed between the electric motor and second stage components.

4. The modular actuation device of claim 2, wherein the at least two-stages comprises third stage components disposed between first stage components and second stage components.

5. The modular actuation device of claim 1, wherein the electric motor comprises a brushless or brushed DC motor.

6. The modular actuation device of claim 1, further comprising a position sensor associated with the electric motor.

7. The modular actuation device of claim 1, wherein the outer support structure and the outer casing of the electric motor are configured in a cylindrical form factor.

8. The modular actuation device of claim 1, wherein an output shaft of the electric motor is configured to transfer torque directly to a sun gear of the epicyclic gear train.

9. The modular actuation device of claim 8, wherein the sun gear and the output shaft are rotatable about a common axis.

10. The modular actuation device of claim 8, wherein a portion of the output shaft forms the sun gear.

11. The modular actuation device of claim 1, wherein the torque output member comprises a planetary gear carrier.

12. The modular actuation device of claim 1, wherein the epicyclic gear train comprises a ring gear that is integral with the outer support structure.

13. The modular actuation device of claim 1, wherein the outer support structure comprises an annular cap to secure the torque output member to the outer support structure and provide an opening to facilitate access to the torque output member for coupling with the object.

14. The modular actuation device of claim 1, wherein an axis of rotation of the electric motor is parallel to an axis of rotation of the torque output member.

15. An actuation system comprising:
an external support member and an object moveable relative to the external support member; and
a modular actuation device, having
an outer support structure coupled with the external support member,
an electric motor to provide an input torque and having an outer casing coupled to the outer support structure,
an epicyclic gear train disposed within the outer support structure and operably coupled to the electric motor to receive the input torque, wherein the epicyclic gear train is configured to provide an output torque to move the object, and
a torque output member disposed at least partially within the outer support structure and coupled to the epicyclic gear train to receive the output torque, wherein the torque output member is configured to couple with the object,
wherein the external support member comprises a cylindrical opening configured to receive at least a portion of the modular actuation device.

16. The system of claim 15, wherein the object comprises an aerodynamic control surface.

17. The system of claim 15, wherein a longitudinal axis of the cylindrical opening is parallel to an axis of rotation of the electric motor.

18. The system of claim 15, wherein an axis of rotation of the electric motor is parallel to an axis of rotation of the torque output member.

19. The system of claim 15, wherein the outer support structure is coupled with the external support member via one or more fasteners.

20. A method for facilitating actuation of an object, the method comprising:
providing a modular actuation device having
an outer support structure,
an electric motor to provide an input torque and having an outer casing coupled to the outer support structure,
an epicyclic gear train disposed within the outer support structure and operably coupled to the electric motor to receive the input torque, wherein the epicyclic gear train is configured to provide an output torque to move an object,
a torque output member disposed at least partially within the outer support structure and coupled to the epicyclic gear train to receive the output torque, and
a platform needle roller thrust bearing and a radial ball bearing disposed between the torque output member and the outer support structure;
facilitating coupling of the outer support structure with an external support member; and
facilitating coupling of the torque output member with the object.

21. The method of claim 20, wherein the axis of rotation of the electric motor is coaxial to the axis of rotation of the torque output member.

* * * * *